US010346488B1

(12) United States Patent
Khoury et al.

(10) Patent No.: US 10,346,488 B1
(45) Date of Patent: Jul. 9, 2019

(54) FILTERING AND SCORING OF WEB CONTENT

(71) Applicant: SOCi, Inc., San Diego, CA (US)

(72) Inventors: Afif Khoury, San Diego, CA (US); Alo Sarv, Bangkok (TH)

(73) Assignee: SOCI, INC., San Diego, CA (US)

( * ) Notice: Subject to any disclaimer, the term of this patent is extended or adjusted under 35 U.S.C. 154(b) by 944 days.

(21) Appl. No.: 14/736,196

(22) Filed: Jun. 10, 2015

(51) Int. Cl.
*G06F 16/9535* (2019.01)
*G06F 16/958* (2019.01)
*G06F 16/2457* (2019.01)

(52) U.S. Cl.
CPC .... *G06F 16/9535* (2019.01); *G06F 16/24578* (2019.01); *G06F 16/958* (2019.01)

(58) Field of Classification Search
CPC ....................... G06F 17/30867; G06F 17/3053
USPC .......................................................... 707/723
See application file for complete search history.

(56) References Cited

U.S. PATENT DOCUMENTS 9,117,228 B1 * 8/2015 Akadiri .................. G06Q 30/00
2003/0130982 A1 * 7/2003 Kasriel ............... G06F 17/3089
2010/0030722 A1 * 2/2010 Goodson ................ G06Q 30/02 706/54
2012/0324008 A1 * 12/2012 Werz, III ............... G06Q 30/02 709/204
2013/0159233 A1 * 6/2013 Mason .............. G06F 17/30864 706/45
2014/0025688 A1 * 1/2014 Andler ............. G06F 17/30563 707/748
2014/0149339 A1 * 5/2014 Title ....................... G06Q 30/02 707/609
2014/0278308 A1 * 9/2014 Liu ......................... H04L 67/22 703/6
2016/0224683 A1 * 8/2016 Hicks .................... G06F 16/211
2016/0267520 A1 * 9/2016 Kalish ................ G06Q 30/0242

* cited by examiner

*Primary Examiner* — Jensen Hu
(74) *Attorney, Agent, or Firm* — Mintz, Levin, Cohn, Ferris, Glovsky and Popeo, P.C.

(57) ABSTRACT

A method includes retrieving, by executing a scored content generator, a web content collection. The web content collection includes first metadata associated with the web content collection as a whole, content items, and second metadata associated with the content items. The second metadata also includes metrics characterizing (i) the content items and (ii) at least a portion of the web content collection. Executing a scored content generator, and based on the metrics, a content item performance score is calculated for each of the retrieved content items. Each content item performance score characterizes a level of user interaction with the content items. Data encapsulating the content item performance scores is provided to a first computing system.

22 Claims, 5 Drawing Sheets

FILTERING AND SCORING OF WEB CONTENT

TECHNICAL FIELD

The subject matter described herein relates to the filtering and scoring of examined web content.

BACKGROUND

Web content, such as webpages, messages, images, articles, videos, blog posts, social media posts and other forms of communication posted to internet pages often relate to topics of interest to users, consumers, and advertisers. On many platforms, the performance of web content in generating user interest is represented by, for example, "views", "comments," "shares," "retweets", "favorites," "ratings," "rankings," and so on. Furthermore, the metrics associating the web content with web content performance are not standardized across the internet, making comparison of similar web content challenging.

SUMMARY

This disclosure includes implementations of systems, apparatus, methods, and computer program products related to facilitating and scoring of web content. In addition, at least some implementations include features for providing the top scoring content to users for reference in generating their own original successful content. In some implementations, the scoring is provided by empirical algorithms that accurately measure the performance of a web content collection in terms of a specific set of metrics relating to the web content collection.

In one aspect, a method includes retrieving, by executing a scored content generator, a web content collection. The web content collection includes first metadata associated with the web content collection as a whole, content items, and second metadata associated with the content items. The second metadata also includes metrics characterizing (i) the content items and (ii) at least a portion of the web content collection. Executing a scored content generator, and based on the metrics, a content item performance score is calculated for each of the retrieved content items. Each content item performance score characterizes a level of user interaction with the content items. Data encapsulating the content item performance scores is provided to a first computing system.

In one implementation, the scored content generator can search stored previously-scored content items, and based on the searching, display a portion of the stored previously-scored content items and a stored content item score associated with each of the displayed portion of the stored previously-scored content items.

In another implementation, the retrieved content items form part of a single page. Here, the method further includes calculating, by at least one data processor executing the scored content generator, a page performance score based on the content item performance scores associated with the retrieved content items. Also, data encapsulating the page performance score can be provided to the first computing system. The calculating of the page performance score can further be based on page metrics including: a number of page views, a page size, or a number, frequency, and/or consistency of the content items on the page.

In yet another implementation, where the retrieved content items are from a plurality of pages from a single website, the method can further include calculating, by at least one data processor executing the scored content generator, a website performance score. The website performance score can be based on the content item performance scores associated with the retrieved content items. Data encapsulating the website performance score can be provided to the first computing system. The calculating of the website performance score can be further based on website metrics including: a number of website views, a website size, or a number, frequency, and/or consistency of the content items on the website.

In one implementation, the calculating of the content item performance scores can further be based on an identity of at least one page associated with each of the content items. The retrieved web content collection can be filtered to exclude at least one of the content items from the web content collection to be scored. The filtering can be performed by a page filter and/or a web content filter, where the page filter and/or the web content filter comprises at least one of a keyword filter, a character number filter, a language filter, a geolocation filter, an antonym filter, or a chronological filter.

In yet another implementation, a scored web content collection can be generated that includes content items and can be based on the content item performance scores. Second data encapsulating the scored web content collection can be provided to a second computing system. The scored web content collection can include the content item that received a highest final content item score. The content items from the second data can also be modified by a user. The content items from the scored web content collection can be provided to a third computing system for publication during a time period when, based on third metadata from the third computing system, a predetermined condition is satisfied. The predetermined condition can be a peak-traffic window for user traffic to the third computing system. Also, providing the first data can include: displaying at least a portion of the first data, transmitting at least a portion of the first data to the second computing system, loading at least a portion of the first data into memory, and/or storing at least a portion of the first data.

In one implementation, the retrieving can further include querying a website providing a portion of the web content collection, the query having a restriction where the retrieved web content collection corresponds to the restriction. The restriction can include: a keyword restriction, a character number restriction, a language restriction, a geolocation restriction, an antonym restriction, or a chronological restriction.

In another implementation, the calculating can include determining at least one parameter based on the second metadata. The first metadata and the second metadata can characterize information about the web content collection and the content items, and for example, can include: line count, page count, memory size, addresses, HTML tags, traffic statistics, views, and/or titles. Also, at least one pre-determined factor can be applied to the at least one parameter, the pre-determined factor characterizing a relative weighting of the at least one parameter. A raw content item performance score can be calculated based parameters and pre-determined factors by applying a weighting to the parameters. The weighting can characterize a content-type dependent scaling of a pre-weighted raw content item performance score. The content item performance score can be calculated by applying a mapping function to the raw content item performance score, where the content item performance score is between a maximum value and a minimum value. The at least one parameter can be a numerical value representing a “like,” “dislike,” “tweet,” “retweet,” “favorite,” “+1,” “view,” “unique view,” “fan,” “follow,” “viral posting,” “paid posting,” “storyteller posting,” “click,” “hide,” “comment,” or “share” determined from the second metadata. The parameters can correspond to the web content collection when retrieved from social networking websites.

In another interrelated aspect, a method includes retrieving, by executing a scored content generator, web content collection. The web content collection includes first metadata associated with the web content collection as a whole, pages, and second metadata associated with the pages. The second metadata also includes metrics characterizing (i) the pages and (ii) at least a portion of the web content collection. Executing a scored content generator, and based on the metrics, a page performance score is calculated for each of the retrieved pages. Each page performance score characterizes a level of user interaction with the pages. Data encapsulating the page performance scores is provided to a first computing system.

In an interrelated aspect, non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other aspects will now be described in detail with reference to the following drawings.

DETAILED DESCRIPTION

This document describes filtering and scoring of examined web content. The systems and methods described herein can be used to examine and score any web content collection, for example, advertising, personal or business webpages, blogs, social media posts, etc. The subject matter described herein can be utilized by advertisers or other suppliers of web content to determine what “works” for creating web content that performs well in generating user engagement, thus providing guidance for the generation of original web content. Alternatively, web content that is in the public domain, and determined to perform well, can be reproduced, referenced, or otherwise referred to, in the context of promoting or presenting the user's web content.

While the performance of web content is typically difficult to quantify, some platforms provide metrics associated with their web content that allow users to self-report their level of engagement, for example “likes,” “dislikes,” etc. Furthermore, performance can reflect more objective measures, such as reach, engagement, comments, shares, etc. of pages or individual pieces of web content. It can be assumed that the general level of user engagement is proportional to the appropriate metric, however an accurate representation often defies simple mathematical relationships. Also, the success of web content or websites in generating user interest can depend on many factors such as the type of site the web content comes from, the user base, how the web content is used on a website, etc. Accordingly, an empirical formulation representing performance of the web content collection that is based on the metrics associated with the web content collection is one way of addressing this challenge. Such a formulation can be presented in the form of scores assigned to selected web content as well as providing top scoring examples of web content to users.

Figure 1:
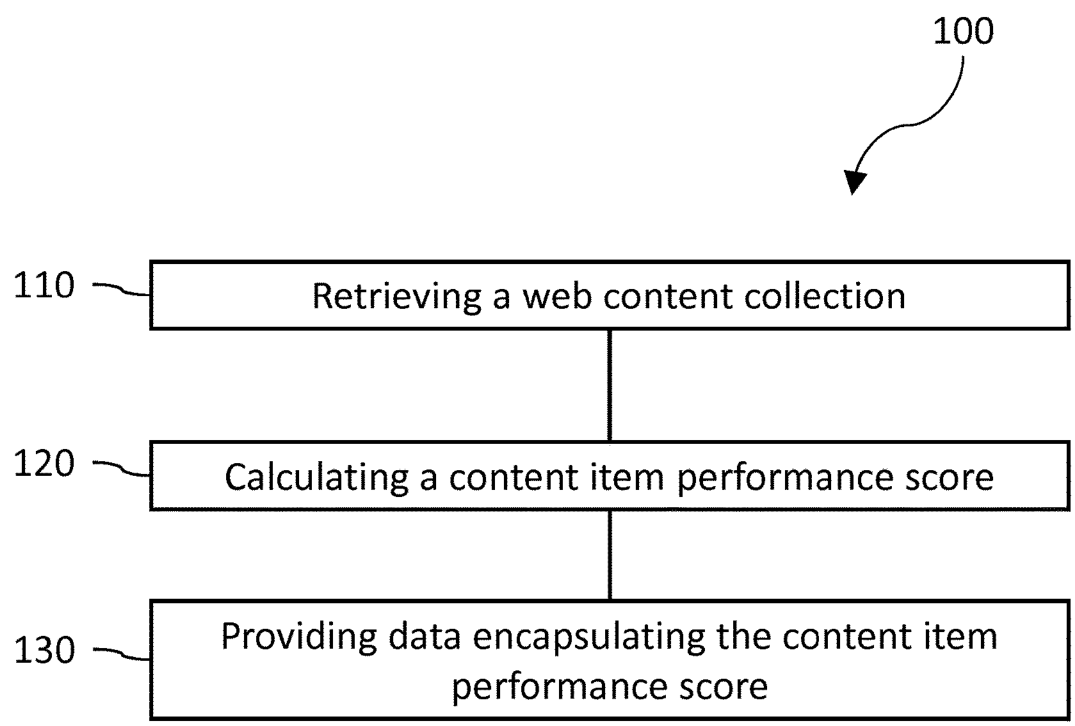
FIG. 1 is a process flow diagram illustrating the retrieving and scoring of content items.

FIG. 1 is a process flow diagram 100 illustrating retrieving and scoring of content items. At 110, a web content collection, which can include any content accessible via the Internet, for example, webpages, blogs, blog posts, images, articles, videos, social media posts, etc. can be retrieved. The retrieving can be by one or more computing systems having at least one data processor executing a scored content generator. The web content collection can include first metadata associated with the web content collection as a whole, content items, and second metadata associated with the content items. The first metadata, for example, can include the size of the web content collection, the location from which the web content collection is retrieved, characteristics of the location from which the web content collection is retrieved including size of viewership or fan base, the numbers and types of content items in the web content collection, etc. The second metadata can include metrics characterizing (i) the content items and (ii) at least a portion of the web content collection. The second metadata is similar to the first metadata, but can include additional information relating to the content items. The metrics in the second metadata can further include the type, size, origin, etc. of the content items. The first metadata and the second metadata can further characterize information about the web content collection and the content items, for example by describing: line count, page count, memory size, addresses, HTML tags, traffic statistics, views, and/or titles.

At 120, at least one data processor executing a scored content generator and based on the metrics, can calculate a content item performance score for each of the retrieved content items that each characterize a level of user interaction with the content items. The details of the calculation are described further in FIG. 4.

At 130, at least one data processor can provide data encapsulating the content item performance scores to a first computing system. Details of the various computing systems are further described in FIGS. 2-3.

Figure 2:
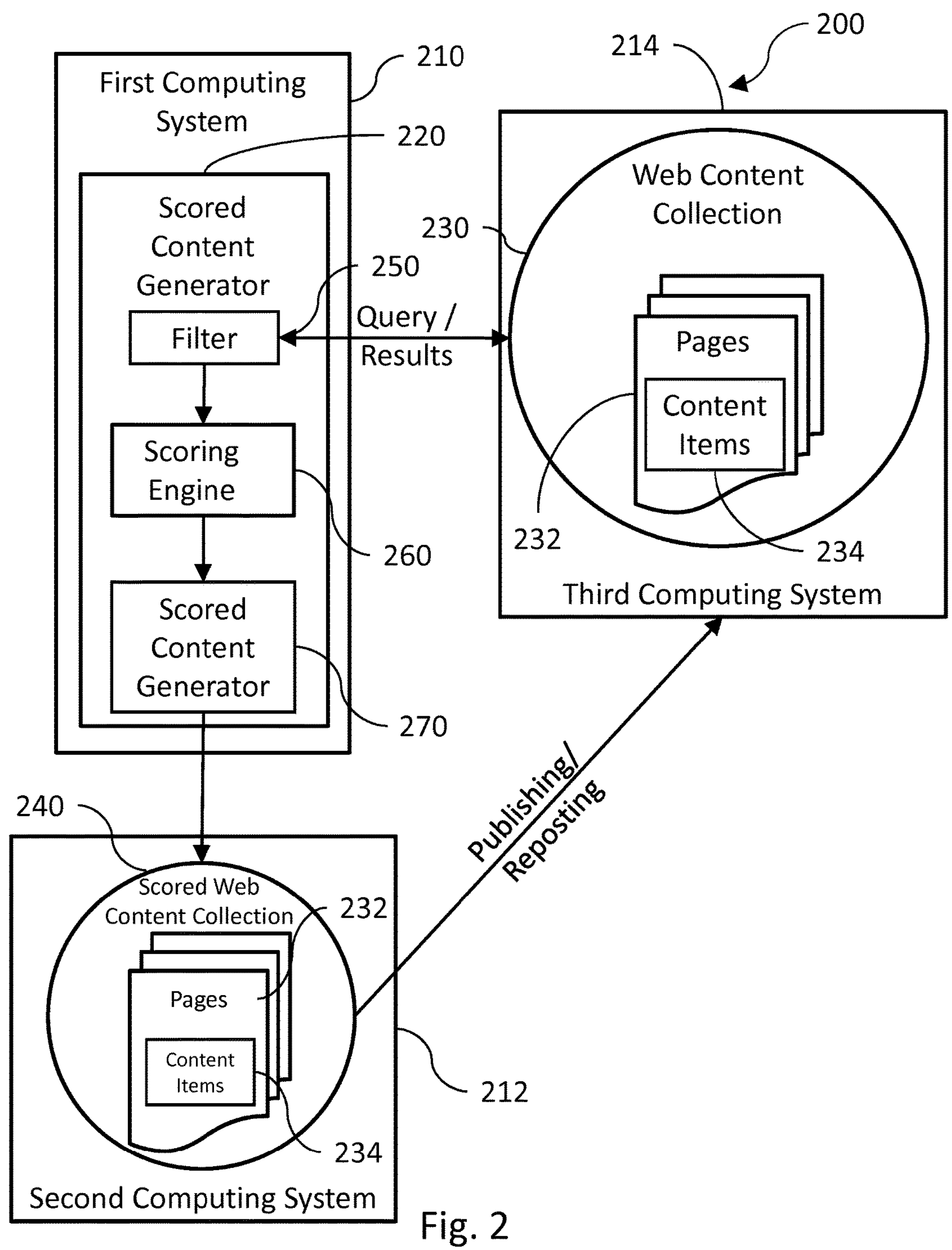
FIG. 2 is a diagram illustrating a system for generating a scored web content collection.

FIG. 2 is a diagram 200 illustrating a system for generating a scored web content collection 240. The innumerable platforms for web content collection 230, for example, FACEBOOK, TWITTER, LINKEDIN, GOOGLE PLUS, PINTEREST, INSTAGRAM, blogs, individual and/or commercial webpages, etc. can provide, either individually or in combination, a web content collection 230 to be analyzed and scored. As used in this application, the web content collection 230 can be considered to be made up of pages 232, each of the pages 232 having one or more content items 234. The pages 232 can refer to web pages, groups of web pages, blogs, FACEBOOK or other social media site pages, aggregated postings of internet content, RSS feeds, etc. As used in this application, content items 234 can refer to, for example, text, images, video, sounds, blog postings, etc. Content items can also be social media posts, for example, FACEBOOK posts, TWITTER "tweets", GOOGLE PLUS messages, LINKEDIN messages, PINTEREST "pins", INSTAGRAM posts, etc. as well as comments, reviews, etc.

Additionally, to provide a starting point for a user in determining where or how to look for successful web content, the scored content generator 270 can optionally allow a search of previously scored pages 232 and the content items 234 stored in the first computing system 210 or other connected computing systems. Based on the searching, a portion of the stored previously-scored content items 234 and a stored content item score associated with each of the displayed portion of the stored previously-scored content items 234 can be displayed.

The search can return, for example, full posts or other scored web content or pages, keywords, images, excerpts, etc. as well as the score associated with the returned search items. In some implementations, web content may not be stored by the systems described herein, for example, the system may only retain listings, descriptions, or links to successful web content. The deliberate avoidance of archiving the web content can be performed to comply with the privacy or usage policies of the web content providers.

In order to have the best chance of identifying successful web content, a large body of data can be searched. To retrieve a web content collection 230 for analysis, the scored content generator 270 can query providers of web content collection 230 using platform specific API's to obtain pages 232, content items 234, feeds, streams, etc. Other forms of browsing, crawling, or data-mining can also be used to obtain or analyze pages 232 or content items 234.

Given the vast amount of web content available to characterize and score, queries that are sent to providers (FACEBOOK, etc.) of portions of web content collections 230 can further include one or more restrictions to limit the retrieved web content collection 230. The retrieved web content collection 230 can correspond to restrictions such as, for example, a keyword restriction, a character number restriction, a language restriction, a geolocation restriction, an antonym restriction, or a chronological restriction.

The restrictions can allow the web content collection 230 host site to filter what is returned, for example "return web pages updated within the past month", or return responses according to a keyword specified in the query. The query can reference items in the pages 232 such as page title, page description, page content, hyperlinks, metadata, etc. to determine what pages 232 or content items 234 to return. Also, the restrictions submitted via the API can be those identified by the user search of previously scored web content, described above. The query can be active, only sent out at particular times by the scored content generator 270, or passive, where the scored content generator 270 is continuously receiving pages 232 or content items 234 from previously specified sources.

The received web content collection 230 can include the content items 234, pages, postings, blog entries, images, audio, video, or any other content resulting from the query. The web content collection 230 can also include metadata relating to the pages 232 or content 242 in the web content collection 230, for example, number of fans, posting dates, "likes," "comments," "shares," etc. Once the web content collection 230 is received by the scored content generator 270, the web content collection 230 can be further filtered by the scored content generator 270 as described below. Though the filtering is shown in FIG. 2 as preceding the scoring of the received web content, the filtering can be applied either before scoring, after scoring, or both.

By doing a pre-filtering of the received web content collection 230, it can be more likely that web content ultimately determined to be valuable will be found faster. The pre-filtering can be based on viewership, "hits," "likes," "shares," or any sort of metadata or metrics included with the pages 232 or content items 234. A filter 250 can be applied to the received web content to exclude at least one of the content items 234 from the web content collection 230. The filtering can be performed by, for example, a page filter and/or a web content filter. Any number and combination of filters 250 can be applied to the web content collection 230. For example, once the page filter has returned only those pages containing references to dentists, the content item filter can filter those pages to get only the content items 234 that refer to dentists and discarding content items 234 which do not. These filters can include, for example, a keyword filter, a character number filter, a language filter, a geolocation filter, an antonym filter, a chronological filter, etc.

Keyword filtering, for example, "coffee," "motorcycles," "housecleaning," etc. can be used to only return the pages 232 or the content items 234 containing or relating to those keywords. Additional filters 250 can be applied to the pages 232 or the content items 234, for example, filtering by language, in order to include only particular languages, such as English or Spanish. Filtering can be by location, for example, country, region, city, zip code, or within a certain distance of any of the foregoing.

To determine the highest scoring content items 234 as quickly as possible, the subset of the web content collection 230 can be ordered before scoring the subset of the web content collection 230. The ordering can be based on, for example, a fan base, metadata, a relevance score, website viewership, create date, keyword, category, or any other metrics believed to be a good indicator of high scoring web content.

Depending on the number of filters 250, the query parameters, etc. the querying and filtering of received web content can continue until a specified number of results have been found. At this point, the subset of web content collection 230 can represent ordered, relevant content, in specified language(s), etc. Once filtered and ordered, the resulting subset of the retrieved web content collection 230 can be further analyzed and scored as described below.

A scoring engine 260 can apply one or more scoring algorithms to provide a raw score for each of the pages 232 and/or content items 234 in the received web content collection 230. We will first begin by describing how content items 234 are scored, and then describe (in FIG. 3) differences when scoring pages 232 and websites.

A score can characterize the past performance of the content items 234 in the subset of the retrieved web content collection 230. To provide a basis for calculating a score for each of the content items 234, the scoring engine 260 can utilize metadata associated with the content item 242 to provide a metric relating to past performance.

The second metadata, associated with the content items 234, can include one or more metrics associated with the content items 234. Metrics used can include, for example, likes, forwards, comments, etc. Metrics can also include one or more metrics associated with the page 240 from which the content item was derived, for example, size of the fan base or viewership, identity of the page, etc. Other metrics can include, for example, the use or lack of certain characters in the text (e.g. question marks, exclamation points, etc.) or the use of various media types (e.g. images, videos, etc.)

The metrics can be used to determine parameters for the scoring algorithms, based on at least the second metadata, used by the scoring engine 260 when calculating a score for a content item. Parameters can be a numerical value representing at least one or more of, for example, a "like," "dislike," "tweet," "retweet," "favorite," "+1," "view," "unique view," "fan," "follow," "viral posting," "paid posting," "storyteller posting," "click," "hide," "comment," or "share" determined from the second metadata.

One example of a scoring algorithm can be expressed as $$\text{Raw score} = \sum_i \frac{f_i * p_i}{w}, \tag{1}$$

where f is a factor that can represent a relevance, correlation, relative weighting, etc. of the parameter p and the sum is taken over any number of parameters and their associated factors. Thus, at least one pre-determined factor can be applied to a parameter, the pre-determined factor characterizing a relative weighting of the parameter. The calculation of the raw content item performance score can based on the at least one parameter and the pre-determined factor(s) by further applying a weighting w to the parameter. The weighting can characterize a content-type dependent scaling of a pre-weighted raw content item performance score.

Web content can include many types of metrics that reflect past performance. However, the different metrics therefore do not necessarily reflect the same degree of past performance. For example, simply "liking" the message/content is easier than writing a comment, so for the messages/content that have mostly comments, just comparing the number of likes of one type of message/content to the number of comments on another type of message/content is not necessarily an accurate comparison. Accordingly, appropriate factors can be applied to the parameters representing the metrics in order to adjust the relative weighting between each of the parameters. Furthermore, the factors can depend on the size and makeup of the user base. For example, if a known user base is more likely to simply "like" something than to write a comment about it, the factor associated with the "like" parameter can be adjusted to reflect this preference.

The overall weighting, w can be determined and applied to the sum. In order for the raw score to be compared across platforms or industries, the weighting can be used to bring the content items 234 having inherently different features, for example, traffic, user demographics, etc. The pseudocode below gives one example of how w can be calculated.

```
w=p//e.g. likes, dislikes, comments
if (lower_bound<w<upper_bound) then
w=size_of_first_deviation+industry_bonus*w/upper_bound
else if (w>upper_bound) then
w=size_of_larger_deviation+industry_bonus*w/upper_bound
```

The lower and upper bounds denote a discrete scaling of w based on predetermined industry coefficients (size of deviations, industry bonus). For example, if considering FACEBOOK likes, if the number of likes is between the 10,000 and 50,000, apply one scaling, and if over 50,000, apply another scaling. The industry bonus can be used to reflect that not all web content collection 230 receives the same amount or kind of user interactions, even if their general quality is equivalent. For example, pop culture icons often receive more likes than obscure artists simply by virtue of exposure. However, the content items 234 relating to the obscure artist can be proportionally more-liked than similar web content for the pop artist, and the scaling can be adjusted to reflect that.

The content item performance score can also be platform specific. For example, with FACEBOOK postings, the content item performance score can be based in part on the number of viral impressions, organic impressions, paid impressions, and unique impressions. One example of a formula used to determine part of the content item performance score can be given by the following pseudocode,

```
performance_score=local_virality+external_virality
```

where, local_virality=min((viral_impressions/post_impressions), normalization) and external_virality=min((storyteller_posts/unique_impressions), normalization).

The particular formulas used to calculate any of the factors in the raw score, or the overall formula of the raw score itself can vary. However it must be stressed that the parameters, the factors, the weightings, or any combination thereof, can be determined, at least in part, by metadata, either the first metadata or the second metadata, associated with the web content collection 230. In this way, a mixture of real data, synthetic data, and pre-determined scaling factors can be combined to provide not only a predictive score, but a score that reflects the particularities of the industry and/or the web content being scored.

Normalization of the raw score can be used to provide a final content item performance score, which can be a standardized measure of the performance of the content item 242. A mapping function can be applied to the raw score in order to transform the raw score into a content item performance score within a minimum value and a maximum value, for example 0-10. The normalization can also capture a functional relationship such as a linear, exponential, geometric, or logarithmic relationship. For example, with a logarithmic normalization on a 0-10 scale, a final score of 9 can represent 10 times more performance than a final score of 8.

The determination of the algorithms, formulas, metrics, weighting coefficients, and normalization methods can be empirical or based upon methods such as least-squares fitting, polynomial fitting, matrix algebra, etc., or any combination thereof.

The content item performance score can provide its own unique quality of feedback as it 1) tests the assumptions made in generating a scored web content collection 240, 2) provides a quantitative comparison of past performance in each of the content items 234 in the scored web content collection 240, and 3) provides a "reality-check" for the scoring algorithm used to generate the scored web content collection 240, i.e. if the performance does not generally correspond to what was found by calculating the content item performance score, this could suggest that the algorithms used in calculating the content item performance score need to be adjusted.

Once the content item performance score is calculated, first data encapsulating the content item performance score can be provided to the first computing system 210 and/or the second computing system 212.

In addition to providing the content item performance scores, the scored content items 234 can themselves be provided. The content items 234 selected to be in the scored web content collection 240 can include any selection of the scored web content collection 240. For example, the scored web content collection 240 can contain content which received the highest content item performance scores, to display the best performing content items 234, the lowest content item performance scores, to display the worst performing content items 234, or anything in between or combination thereof.

The scored web content collection 240 can be provided to any computing system, for example, the second computing system 212, as second data encapsulating the scored web content collection 240. The second data encapsulating the scored web content collection 240 can include, for example, the raw score, the final score, encoded files, page 232, content items 234, tables, graphs, excerpts, or other materials synthesized or extracted from the scored web content collection 240.

The providing can take the form of, for example, transmitting at least a portion of the data, loading at least a portion of the data in memory, or storing at least a portion of the data. The transmitting, loading, or storing can be done on or by the first computing system 210, the second computing system 212, or any combination of the two. The computing systems described herein can be, for example, a computer, a database, a server, a mobile device, a cellular phone, a cloud servers, etc.

The scored web content collection 240 can be used as a source of web content or as a guide to users that wish to create web content that will perform well. The scored web content collection 240 can be examined for common themes that contribute to generating highly-performing content, where such themes might not be readily discernable without the retrieving, filtering, and scoring techniques described above. For example, upon processing a web content collection 230 restricted by the keyword "coffee," then filtered to be written in "English" and posted within the last month, it could be found that the web content that received the five highest final scores all possessed a humorous slogan or image. The insight that humorous slogans or images might be the most effective way of generating highly performing web content can then be used to guide decisions about what to include in future web content, for example, posts, advertisements, articles, etc. relating to coffee and presented to English speakers. Suppose though, that another filter 250 is added, for example to a geographic region where outdoor activities such as hunting are popular. In this example, if the web content that received the highest final score contained themes relating to hunting or outdoor activities, then a geographically tailored approach that includes those themes could be incorporated when seeking to create web content that would be expected to perform well.

The scored web content collection 240 can be displayed, published, reposted, etc. to the third computing system 214 according, for example, a desired time to post, type of post, website identity, etc. The scored web content collection 240 can also be reproduced in a manner that allows the user to share, save, or edit the scored web content collection 240. This includes allowing a user to modify the content items 234 scored and provided with the second data. For example, the user's company or product name can be substituted for a generic name, formats and/or presentation appearances can be modified, images can be replaced or edited, text can be layered on top of images, etc.

Scored content can also be reposted back to, for example, the user's own FACEBOOK page, website, etc. The content items 234 from the scored web content collection 240 can also be provided back to the third computing system 214 for publication during a time period when, based on third metadata from the third computing system 214, a predetermined condition is satisfied. For example, the predetermined condition can be a peak-traffic window for user traffic to the third computing system 214.

Figure 3:
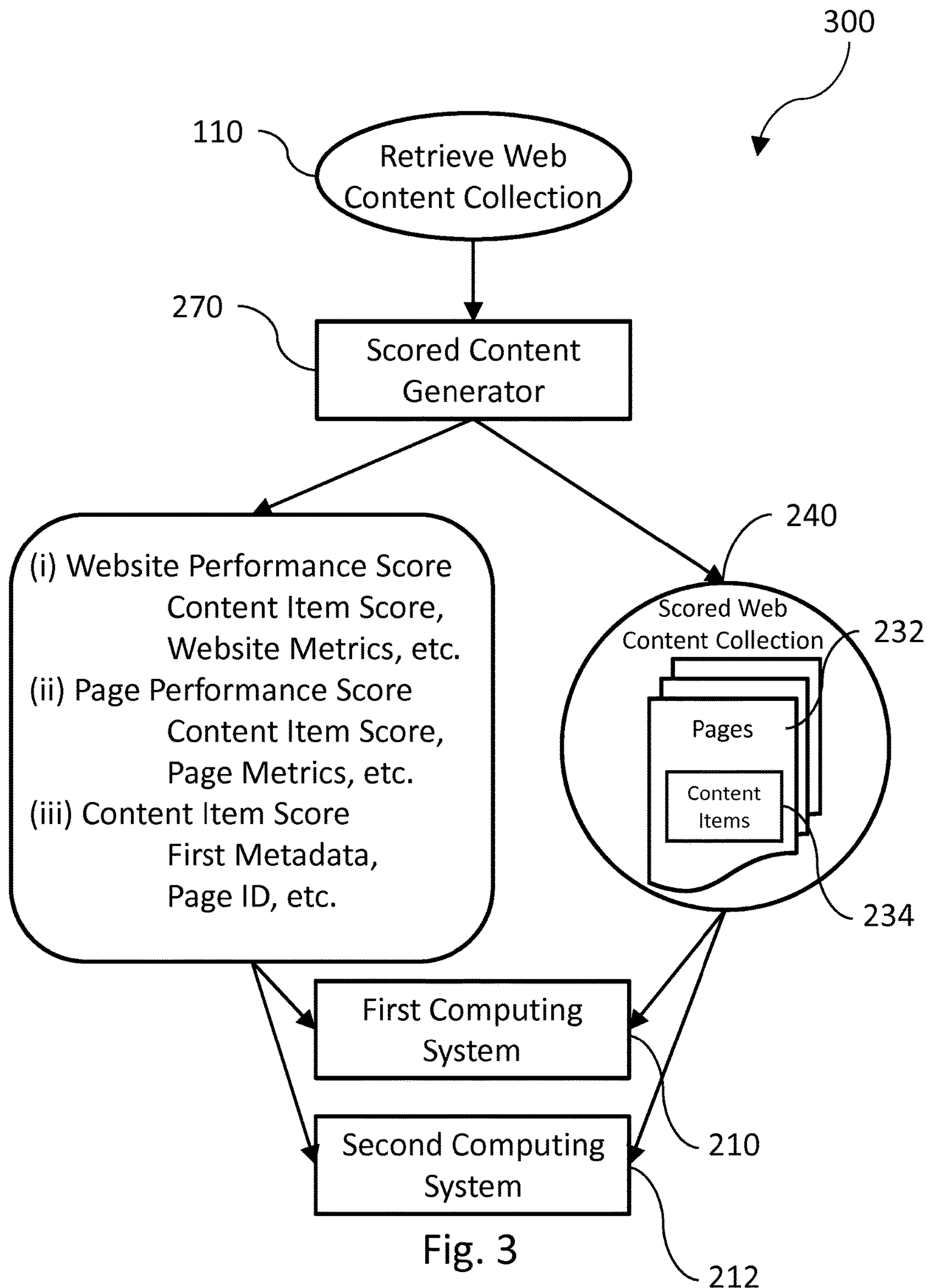
FIG. 3 is a diagram illustrating the scoring of content items, pages, and websites.

FIG. 3 is a diagram illustrating the scoring of content items 234, pages 232, and websites. Again, as used herein, a general hierarchy of web content can be described as: (i) websites, comprised of a number of pages 232, and (ii) pages 232, comprised of a number of (iii) content items 234. The scoring of pages 232 and websites can be similar to the scoring of content items 234 as described in FIGS. 1-2.

When scoring pages 232, where the retrieved content items 234 form part of a single page 232, a page performance score can be calculated based on, for example, the content item performance scores associated with the retrieved content items 234. In this way, the page performance score can reflect the overall success of the content items 234 that comprise the page. The page performance score can be further based on page metrics, which can be similar to, or analogous to, content item metrics. Page metrics can include, for example, a number of page views, a page size, or a number, frequency and/or consistency of the content items 234 on the page. One example of taking these factors into account, is if highly scoring content is posted to a page 232, but only rarely, then despite the highly scoring content being shown, the page 232 could receive a lower page performance score.

When scoring websites, where the retrieved content items 234 are from pages 232 from a single website, a website performance score can be calculated based on the content item performance scores associated with the retrieved content items 234. Similar to scoring pages 232, the website performance score can be determined in part from the scores of the content items 234 that comprise it. Also, the calculating of the website performance score can be further based on website metrics including, for example, a number of website views, a website size, or a number, frequency and/or consistency of the content items 234 on the website.

Similar to that shown in FIG. 2, once the page performance score and/or the website performance score is calculated, data encapsulating the page performance score, and/or the website performance score can be provided to the first computing system 210 and/or the second computing system 212.

Figure 4:
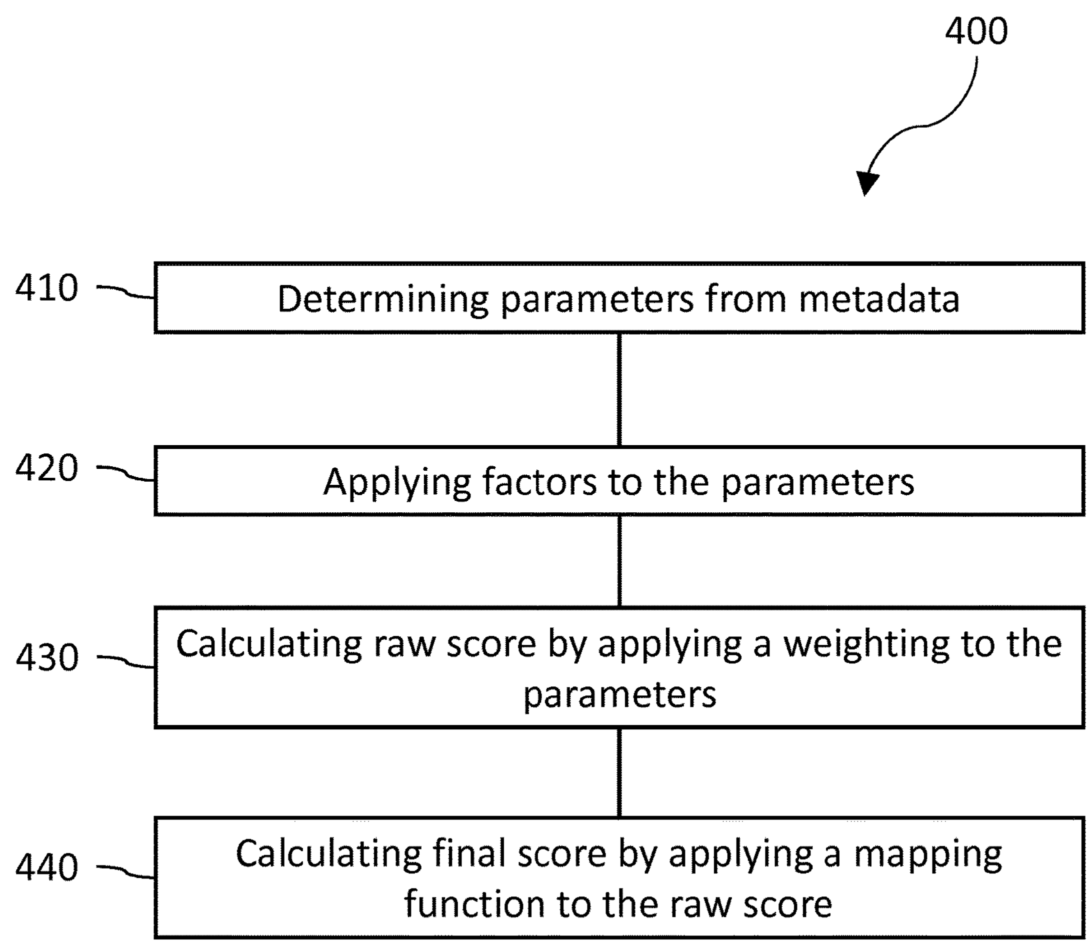
FIG. 4 is a process flow diagram illustrating features of calculation of the scores.

FIG. 4 is a process flow diagram illustrating features of calculation of the scores. The calculation of a score can apply similarly when calculating content item performance scores, page performance scores, and/or website performance scores.

At 410, parameters can be determined based on the content metadata.

At 420, factors can be applied to the parameters, where the factors characterize a relative weighting of the parameters.

At 430, the raw score can be calculated based on the parameters and the factors by applying weightings to the parameters. The weightings can characterize a content-type dependent scaling of the pre-weighted raw score.

At 440, a final score can be calculated by applying a mapping function to the raw score, where the final score is between a maximum value and a minimum value.

Figure 5:
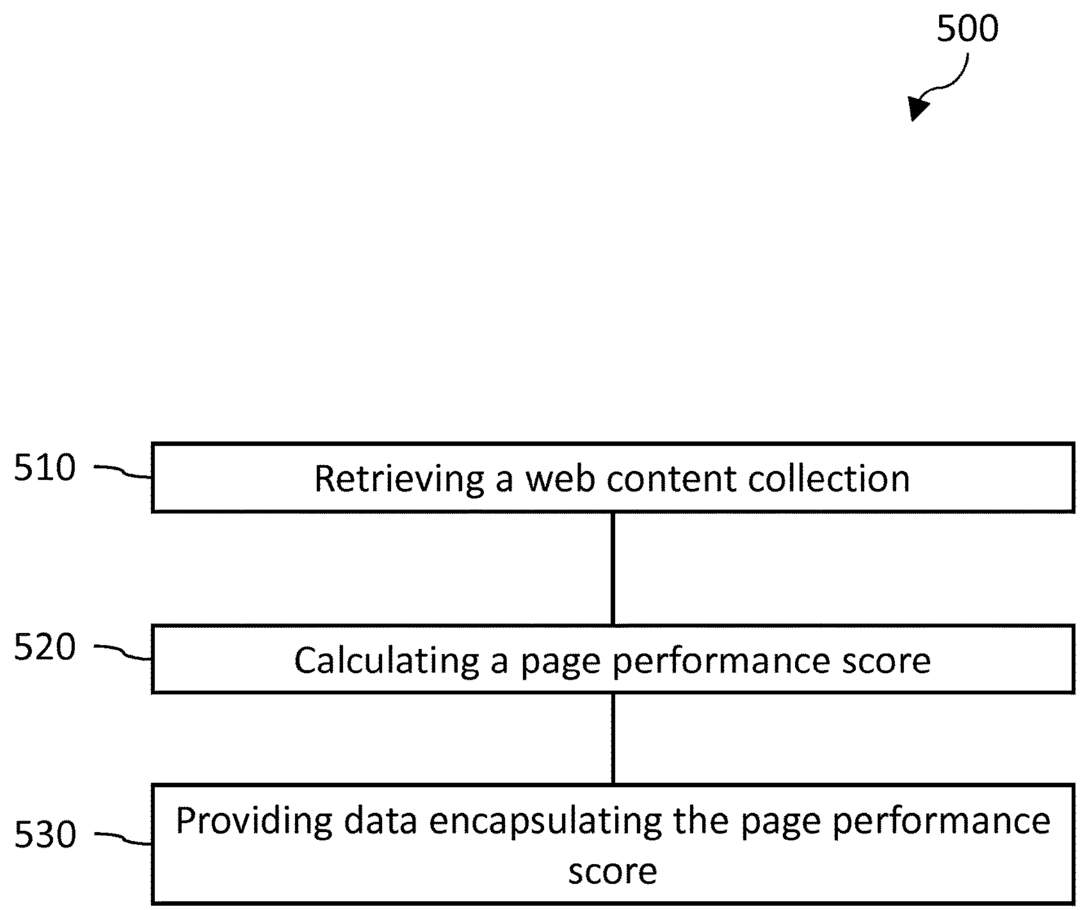
FIG. 5 is a process flow diagram illustrating the retrieving and scoring of pages.

FIG. 5 is a process flow diagram illustrating the retrieving and scoring of pages. FIG. 5 is similar to FIG. 1, but describes the scoring of pages as further detailed in FIGS. 1-4. At 510, a web content collection 230, can be retrieved and include any content accessible via the Internet, for example, webpages, blogs, blog posts, images, articles, videos, etc. The retrieving can be by one or more computing systems having at least one data processor executing a scored content generator 270. The web content collection 230 can include first metadata associated with the web content collection 230, as a whole, content items 234, and second metadata associated with the pages. The first metadata, for example, can include the size of the web content collection 230, the location from which the web content collection 230 is retrieved, the numbers and types of content items 234 in the web content collection 230, etc. The second metadata can include metrics characterizing (i) the pages and (ii) at least a portion of the web content collection 230. The second metadata is similar to the first metadata, but can include additional information relating to the pages. The metrics that comprise second metadata can further include the type, size, origin, etc. of the pages.

At 520, at least one data processor executing a scored content generator 270 and based on the metrics, can calculate a page performance score for each of the retrieved pages that each characterize a level of user interaction with the pages.

At 530, at least one data processor can provide data encapsulating the page performance scores to a first computing system 210. Details of the various computing systems were further described in FIGS. 2-3.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WiFi, and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:

retrieving, by at least one data processor executing a scored content generator, a web content collection comprising:

first metadata associated with the web content collection as a whole, the first metadata comprising one or more of a size of the web content collection, a location from which the web content collection is retrieved, characteristics of the location, a number of content items, type of content items, characteristics of the content items, line count, page count, memory size, addresses, HTML tags, traffic statistics, views, and titles, content items, and second metadata associated with the content items, the second metadata comprising metrics characterizing (i) the content items and (ii) at least a portion of the web content collection, the metrics characterizing the content items comprising an evaluation of one or more of a like, dislike, tweet, retweet, favorite, +1, view, unique view, fan, follow, viral posting, paid posting, storyteller posting, click, hide, comment, a share, a forward, a comment, and other evaluation by a viewer of at least one of the content items;

calculating, by at least one data processor executing a scored content generator and based on the metrics, a content item performance score for each of the retrieved content items that each characterize a level of user interaction with the content items, wherein the calculating comprises:

determining at least one parameter based on the second metadata;

applying at least one pre-determined factor to the at least one parameter, the pre-determined factor characterizing a relative weighting of the at least one parameter;

calculating a raw content item performance score based on the at least one parameter and the at least one pre-determined factor by applying at least one weighting to the at least one parameter, the weighting characterizing a content-type dependent scaling of a pre-weighted raw content item performance score; and calculating the content item performance score by applying a mapping function to the raw content item performance score, where the content item performance score is between a maximum value and a minimum value; and providing, by at least one data processor, data encapsulating the content item performance scores to a first computing system.

2. The method of claim 1, wherein the retrieved content items form part of a single page and the method further comprises:

calculating, by at least one data processor executing the scored content generator, a page performance score based on the content item performance scores associated with the retrieved content items; and providing, by at least one data processor, data encapsulating the page performance score to the first computing system.

3. The method of claim 2, wherein the calculating of the page performance score is further based on page metrics comprising at least one of: a number of page views, a page size, or a number, frequency and/or consistency of the content items on the page.

4. The method of claim 1, wherein the retrieved content items are from a plurality of pages from a single website and the method further comprises:

calculating, by at least one data processor executing the scored content generator, a website performance score, based on the content item performance scores associated with the retrieved content items; and providing, by at least one data processor, data encapsulating the website performance score to the first computing system.

5. The method of claim 4, wherein the calculating of the website performance score is further based on website metrics comprising at least one of: a number of website views, a website size, or a number, frequency and/or consistency of the content items on the website.

6. The method of claim 1, wherein the calculating is further based on an identity of at least one page associated with each of the content items.

7. The method of claim 1, further comprising:

generating, by at least one data processor, a scored web content collection comprising at least one of the content items and based on the content item performance scores; and providing, by at least one data processor, second data encapsulating the scored web content collection to a second computing system.

8. The method of claim 7, further comprising modifying, by a user, at least one of the content items from the second data.

9. The method of claim 1, further comprising filtering, by at least one data processor, the retrieved web content collection to exclude at least one of the content items from the web content collection to be scored.

10. The method of claim 9, wherein the filtering is performed by a page filter and/or a web content filter, wherein the page filter and/or the web content filter comprises at least one of a keyword filter, a character number filter, a language filter, a geolocation filter, an antonym filter, or a chronological filter.

11. The method of claim 1, the retrieving further comprising:

querying a website providing a portion of the web content collection, the query comprising a restriction; and wherein the retrieved web content collection corresponds to the restriction.

12. The method of claim 11, wherein the restriction comprises at least one of: a keyword restriction, a character number restriction, a language restriction, a geolocation restriction, an antonym restriction, or a chronological restriction.

13. The method of claim 1, wherein providing the first data comprises at least one of: displaying at least a portion of the first data, transmitting at least a portion of the first data to the second computing system, loading at least a portion of the first data into memory, and/or storing at least a portion of the first data.

14. The method of claim 7, wherein the scored web content collection includes the content item that received a highest final content item score.

15. The method of claim 1, wherein the web content collection is retrieved from social networking websites.

16. The method of claim 1, wherein the scored content generator searches stored previously-scored content items, and based on the searching, displays a portion of the stored previously-scored content items and a stored content item score associated with each of the displayed portion of the stored previously-scored content items.

17. The method of claim 7, wherein the at least one of the content items from the scored web content collection is provided to a third computing system for publication during a time period when, based on third metadata from the third computing system, a predetermined condition is satisfied.

18. The method of claim 17, wherein the predetermined condition is a peak-traffic window for user traffic to the third computing system.

19. The method of claim 1, wherein the first metadata and the second metadata characterize information about the web content collection and the content items, the information comprising at least one of: line count, page count, memory size, addresses, HTML tags, traffic statistics, views, and/or titles.

20. A method comprising:

retrieving, by at least one data processor executing a scored content generator, a web content collection comprising:

first metadata associated with the web content collection as a whole, the first metadata comprising one or more of a characteristic of the web content collection, a location from which the web content collection is retrieved, characteristics of the location, characteristics of one or more web pages, HTML tags, traffic statistics, views, and titles, data pertaining to one or more web pages, and second metadata associated with the pages, the second metadata comprising metrics characterizing (i) the web pages and (ii) at least a portion of the web content collection, the metrics characterizing the web pages comprising an evaluation of one or more content items presented at each of the webpages:

calculating, by at least one data processor executing a scored content generator and based on the metrics, a page performance score for each of the retrieved pages that each characterize a level of user interaction with the pages, wherein the calculating comprises:

determining at least one parameter based on the second metadata;

applying at least one pre-determined factor to the at least one parameter, the pre-determined factor characterizing a relative weighting of the at least one parameter;

calculating a raw content item performance score based on the at least one parameter and the at least one pre-determined factor by applying at least one weighting to the at least one parameter, the weighting characterizing a content-type dependent scaling of a pre-weighted raw content item performance score; and calculating the content item performance score by applying a mapping function to the raw content item performance score, where the content item performance score is between a maximum value and a minimum value; and providing, by at least one data processor, data encapsulating the page performance scores to a first computing system.

21. A system comprising:

at least one data processor; and memory storing instructions which, when executed by the at least one data processor, result in operations comprising:

retrieving, by at least one data processor executing a scored content generator, a web content collection comprising:

first metadata associated with the web content collection as a whole, the first metadata comprising one or more of a size of the web content collection, a location from which the web content collection is retrieved, characteristics of the location, number of content items, type of content items, characteristics of the content items, line count, page count, memory size, addresses, HTML tags, traffic statistics, views, and titles, content items, and second metadata associated with the content items, the second metadata comprising metrics characterizing (i) the content items and (ii) at least a portion of the web content collection, the metrics characterizing the content items comprising an evaluation of each of the content items present in the web content collection;

calculating, by at least one data processor executing a scored content generator and based on the metrics, a content item performance score for each of the retrieved content items that each characterize a level of user interaction with the content items, wherein the calculating comprises:

determining at least one parameter based on the second metadata;

applying at least one pre-determined factor to the at least one parameter, the pre-determined factor characterizing a relative weighting of the at least one parameter;

calculating a raw content item performance score based on the at least one parameter and the at least one pre-determined factor by applying at least one weighting to the at least one parameter, the weighting characterizing a content-type dependent scaling of a pre-weighted raw content item performance score; and calculating the content item performance score by applying a mapping function to the raw content item performance score, where the content item performance score is between a maximum value and a minimum value; and providing, by at least one data processor, data encapsulating the content item performance scores to a first computing system.

22. A non-transitory computer program product storing instructions which, when executed by at least one data processor forming part of at least one computing device, result in operations comprising:

retrieving, by at least one data processor executing a scored content generator, a web content collection comprising:

first metadata associated with the web content collection as a whole, the first metadata comprising one or more of a size of the web content collection, a location from which the web content collection is retrieved, characteristics of the location, number of content items, type of content items, characteristics of the content items, line count, page count, memory size, addresses, HTML tags, traffic statistics, views, and titles, content items, and second metadata associated with the content items, the second metadata comprising metrics characterizing (i) the content items and (ii) at least a portion of the web content collection, the metrics characterizing the content items comprising an evaluation of each of the content items present in the web content collection;

calculating, by at least one data processor executing a scored content generator and based on the metrics, a content item performance score for each of the retrieved content items that each characterize a level of user interaction with the content items, wherein the calculating comprises:

determining at least one parameter based on the second metadata;

applying at least one pre-determined factor to the at least one parameter, the pre-determined factor characterizing a relative weighting of the at least one parameter;

calculating a raw content item performance score based on the at least one parameter and the at least one pre-determined factor by applying at least one weighting to the at least one parameter, the weighting characterizing a content-type dependent scaling of a pre-weighted raw content item performance score; and calculating the content item performance score by applying a mapping function to the raw content item performance score, where the content item performance score is between a maximum value and a minimum value; and providing, by at least one data processor, data encapsulating the content item performance scores to a first computing system.

* * * * *